United States Patent
Gopalarathnam et al.

(10) Patent No.: US 10,938,732 B2
(45) Date of Patent: Mar. 2, 2021

(54) SYSTEMS AND METHODS FOR TRAFFIC REDIRECTION ON DISRUPTIVE CONFIGURATIONS IN LINK AGGREGATION GROUPS

(71) Applicant: DELL PRODUCTS L.P., Round Rock, TX (US)

(72) Inventors: Sudharsan Dhamal Gopalarathnam, Redmond, WA (US); Anbalagan Natchimuthu, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 160 days.

(21) Appl. No.: 16/382,810

(22) Filed: Apr. 12, 2019

(65) Prior Publication Data
US 2020/0328982 A1    Oct. 15, 2020

(51) Int. Cl.
*H04L 12/891* (2013.01)
*H04L 12/815* (2013.01)
*H04L 12/24* (2006.01)
*H04L 12/709* (2013.01)
H04L 12/703 (2013.01)
H04L 12/707 (2013.01)

(52) U.S. Cl.
CPC .......... *H04L 47/41* (2013.01); *H04L 41/0816* (2013.01); *H04L 45/245* (2013.01); *H04L 47/22* (2013.01); *H04L 45/22* (2013.01); *H04L 45/28* (2013.01)

(58) Field of Classification Search
CPC ....... H04L 47/41; H04L 45/245; H04L 47/22; H04L 41/0816; H04L 45/28; H04L 45/22
See application file for complete search history.

(56) References Cited

U.S. PATENT DOCUMENTS

| | | | | |
|---|---|---|---|---|
| 2011/0267941 A1* | 11/2011 | Bitar | ....................... | H04L 45/00 370/225 |
| 2014/0254352 A1* | 9/2014 | Natarajan | ............. | H04L 45/245 370/228 |
| 2014/0369186 A1* | 12/2014 | Ernstrom | .............. | H04L 45/586 370/228 |
| 2015/0172121 A1* | 6/2015 | Farkas | .................. | H04L 45/245 370/218 |
| 2017/0063672 A1* | 3/2017 | Chhabra | ................. | H04L 45/28 |

\* cited by examiner

*Primary Examiner* — Vinncelas Louis
(74) *Attorney, Agent, or Firm* — North Weber & Baugh LLP

(57) ABSTRACT

Various systems and methods take advantage of physical interfaces that are a part of Link Aggregation Group (LAG) to avoid traffic drops when disruptive configurations are applied to a port of a switch or router. In embodiments, in networking topologies using (SAN)-based traffic, where zero losses are expected, lossless deployment may be accomplished by using LACP to proactively intervene and redirect traffic flow in both ingress and egress directions of a to-be-configured port, e.g., to other ports of the LAG.

20 Claims, 5 Drawing Sheets

SYSTEMS AND METHODS FOR TRAFFIC REDIRECTION ON DISRUPTIVE CONFIGURATIONS IN LINK AGGREGATION GROUPS

BACKGROUND

The present disclosure relates generally to networking topologies that utilize Link Aggregation Groups (LAGs). More particularly, the present disclosure relates to systems and methods for reducing traffic loss due to disruptive port configurations.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A switch or router in a networking system has certain configurations, such as Quality of Service (QoS)-related configurations, Organizationally Unique Identifiers (OUIs), auto-negotiation values, and correction settings, which vary by protocol or vendor-specific chipset, are typically applied to a port in the switch by a system administrator or automatically (e.g., by an Application-Specific Integrated Circuit (ASIC)). Oftentimes, the configurations to a port disrupt traffic in that they require (or cause) the port to intermittently change its operational state to Down, or require/cause the port be shut down for a period of time.

Configuration-based disruptions can be initiated by software or result from a configuration setting itself. Certain port-related configurations, such as enabling/disabling Forward Error Correction (FEC), OUIs, and changing auto-negotiation parameters, are made with the port's admin state being disabled, which in existing design requires the port's operational state to be Down. In addition, some configurations require that all traffic be disabled before the configuration is applied. For example, changing the queue scheduler parameters on certain chipsets, or changing queue hierarchy in most existing platforms requires traffic to be disabled. Similarly, some QoS-related configurations may disable traffic to a port, without necessarily disabling the port admin state itself.

Configurations in a network that uses a LAG may be handled by a software application that disables egress traffic on the LAG. The LAG table in the ASIC includes LAG member ports to which traffic may be hashed, irrespective of the port's operational state. Once a port goes operationally down, the ASIC may notify the software application that, in response to recognizing the operationally down state, reprograms the LAG table to remove the "failed" port from the LAG and stop traffic to the operationally down port.

The above-mentioned scenarios have the common goal of ensuring that no traffic flows through the port until the configuration settings have been successfully applied to the port. However, in practice, traffic will be dropped on the to-be-configured port whenever a disruptive configuration is applied on a physical interface, until the configuration is actually made and the traffic is properly re-enabled.

For example, due to the time delay between recognizing that an operationally down port is no longer a valid part of a LAG and modifying the LAG table to remove the port from the LAG, which may range anywhere from few milliseconds to even seconds, based on the type of port, the polling interval of linkscan, CPU usage, and other factors, the operationally down port will continue to receive traffic, which will have to be dropped.

Accordingly, it is desirable to provide improved systems and methods that reduce or prevent unnecessary traffic loss caused by disruptive port configurations in networking topologies that utilize LAGs.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
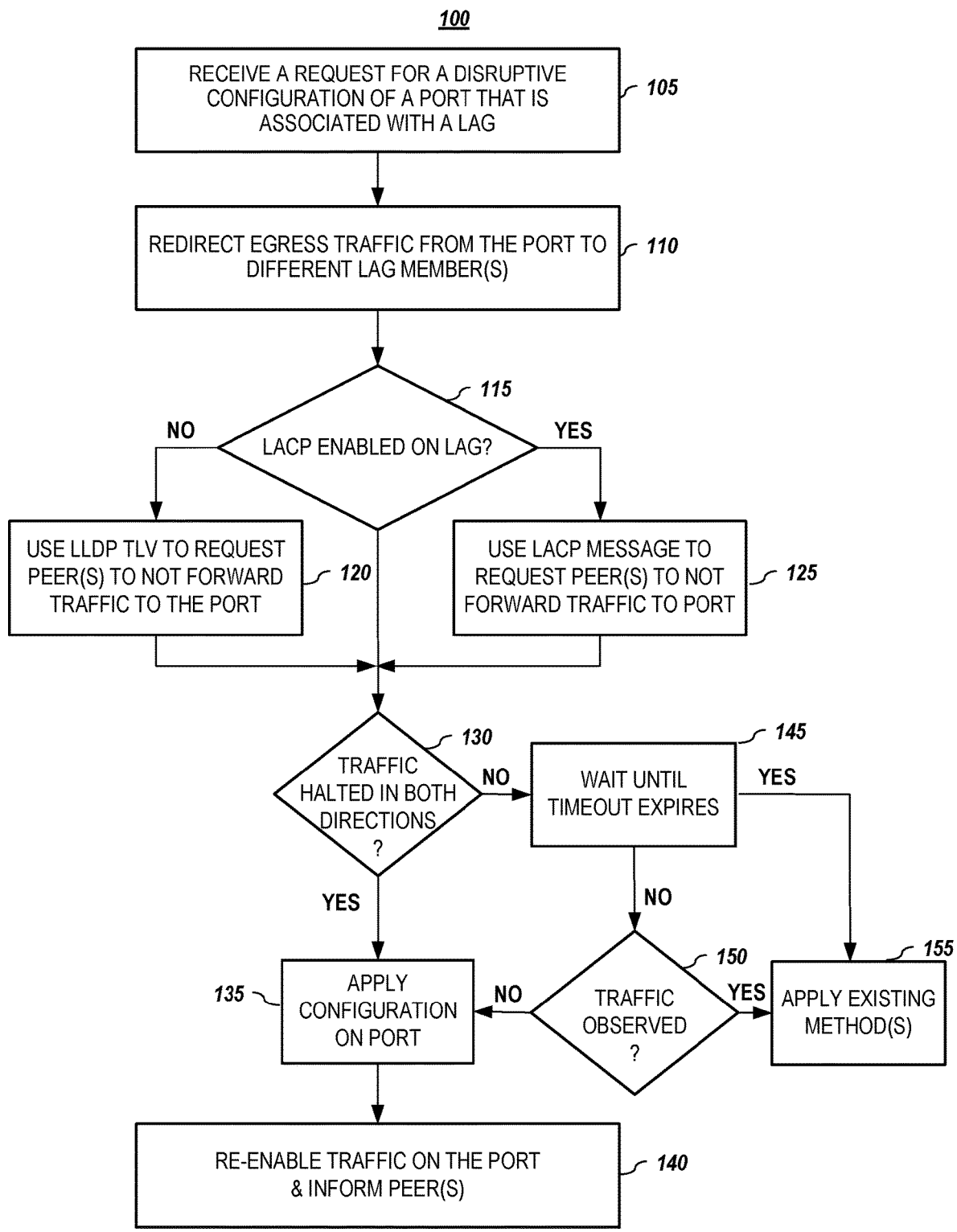
FIG. 1 ("FIG. 1") depicts a flowchart of an illustrative process for reducing traffic loss caused by disruptive port configurations in networking topologies comprising LAGs, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently.

All documents cited herein are incorporated by reference herein in their entirety.

FIG. 1 depicts a flowchart of an illustrative process for reducing traffic loss caused by disruptive port configurations in networking topologies comprising LAGs, according to embodiments of the present disclosure. In embodiments, process 100 begins when, in response to a request being received (105) for any number of disruptive configurations of a physical port that is part of a LAG, egress traffic may be redirected (110) from the port to one or more other LAG members that may be available to carry traffic.

Egress traffic is, for example, traffic local to the switch that is directed out of the port in the LAG. A disruptive configuration may, for example, require that an admin state be disabled, or it may cause any other type of traffic disruption. In embodiments, e.g., as an additional step not shown in FIG. 1, it may be determined whether the port, e.g., a specific port of a local switch to which a disruptive configuration is to be applied is, in fact, part of a LAG.

In embodiments, in response to determining (115) whether a Link Aggregation Control Protocol (LACP) is enabled on the LAG, such that LACP messages may be exchanged between peer devices, an LACP message may be used to request (125) one or more peer devices to not forward or redirect ingress traffic destined to the port. In embodiments, the LACP message may proactively notify a peer device coupled to the port that a disruptive configuration may occur on that port, and that the port and any number of links associated with it, may be temporarily removed from the LAG, such that traffic may be redirected from the affected link(s) to other links in the LAG to prevent traffic from being lost on the port that experiences the disruption.

For designs that support, e.g., Dynamic load balancing or Resilient Hashing, in which the flow to port mapping is available as a table, in embodiments, the redirected flow may be distributed to available ports of the LAG in the ratio of their available bandwidth.

For statically configured LAGs, i.e., where LACP is not enabled (115), requests (120) to a peer device to not forward or redirect ingress traffic destined to the port may be communicated via a Link Layer Discovery Protocol (LLDP).

In embodiments, once it is determined (130) that traffic is halted in both directions, the desired configuration may be applied (135) to the port before the port is then re-enabled (140) to carry traffic. Re-enabling may comprise using LACP and changing back the operational state of the port to Up, such that the LAG may consider the port a LAG member that can send traffic.

In addition, in embodiments, peer devices may be informed (140) of the changed operational state of the port/the successful completion of the configuration to re-enable and/or re-direct traffic to that port, such that, for example, LAG-hashing may consider that port.

If traffic is not halted (130) in both directions, i.e., some traffic is detected in either direction, in embodiments, after a timeout period expires (145), the status of traffic flow may be observed (150). And, upon determining that no traffic is present, process 100 may apply (135) the desired configuration to the port and resume with re-enabling (140) traffic on that port.

Conversely, if traffic is observed (150) in any direction, despite the risk of losing traffic, one or more known methods may be applied as a fallback position.

Figure 2:
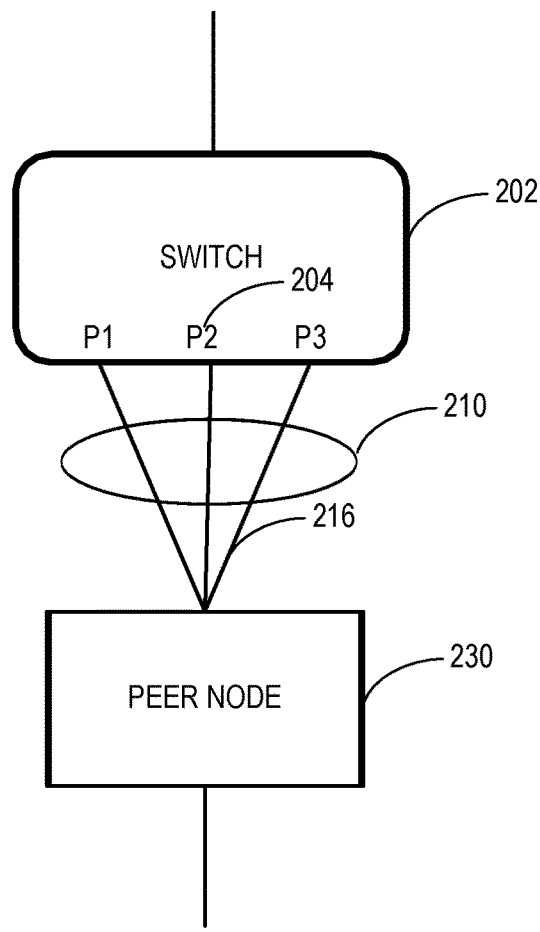
FIG. 2 depicts an illustrative network system that utilizes a LAG to reduce traffic loss caused by disruptive port configurations, according to embodiments of the present disclosure.

FIG. 2 depicts an illustrative network system that utilizes a LAG to reduce traffic loss caused by disruptive port configurations, according to embodiments of the present disclosure. Network system 200 comprises switch 202, LAG peer node 230, and LAG 210. Although in FIG. 2 switch 202 is depicted as comprising three physical ports 204 that are part of shared LAG 210, it is understood that switch 202 may be implemented as any type of network node (e.g., a router). In embodiments, each port 204 is communicatively coupled to LAG peer node 230 via a link 216 over which LACP messages may be exchanged between switch 202 and LAG peer node 230 if LACP is enabled on LAG 210.

In embodiments, switch 202 may receive a request, e.g., initiated by a software application, to update one or more configurations of port P1 in a manner that may cause traffic on port 1 to be disrupted. For example, if Priority-Based Flow Control (PFC) is enabled on port 1, the number of queues in switch 202 may have to be reconfigured due to restrictions on the number of physical hardware queues in certain ASICs. This may require that the admin state of port P1 be disabled. In such a scenario, in order to perform a desired update, port 1 may have to enter a Down operational state, or may be completely shut down for traffic for some amount of time, e.g., until the configuration has been updated.

In embodiments, switch 202 may redirect traffic that would otherwise egress on port P1 to one or more other links on LAG 210, e.g., links associated with port 3. Depending on the available bandwidth of such links, LAG peer devices (not shown) may be available to handle the additional egress traffic for port P1. As a result, traffic may be successfully prevented from being dropped on port P1, despite the disruption caused by the configuration update.

In embodiments, switch 202 may use LACP messages to inform LAG peer node 230 about impending or present disruptive configuration changes that may occur on port P1 and that may temporarily remove port P1 from LAG 210 to prevent traffic loss. In addition, switch 202 may request LAG peer node 230 to redirect its ingress traffic destined to port P1 to port 3 instead, for example.

If LAG 210 has been statically configured, instead of communicating via LACP messages, switch 202 may instead make the request to LAG peer node 230 using LLDP, e.g., with a vendor-specific Type-Length-Value (TLV) format. It is understood that numerous other message types and protocols may be used to communicate information about the impending configuration change and other information between various components in network system 200.

Figure 3:
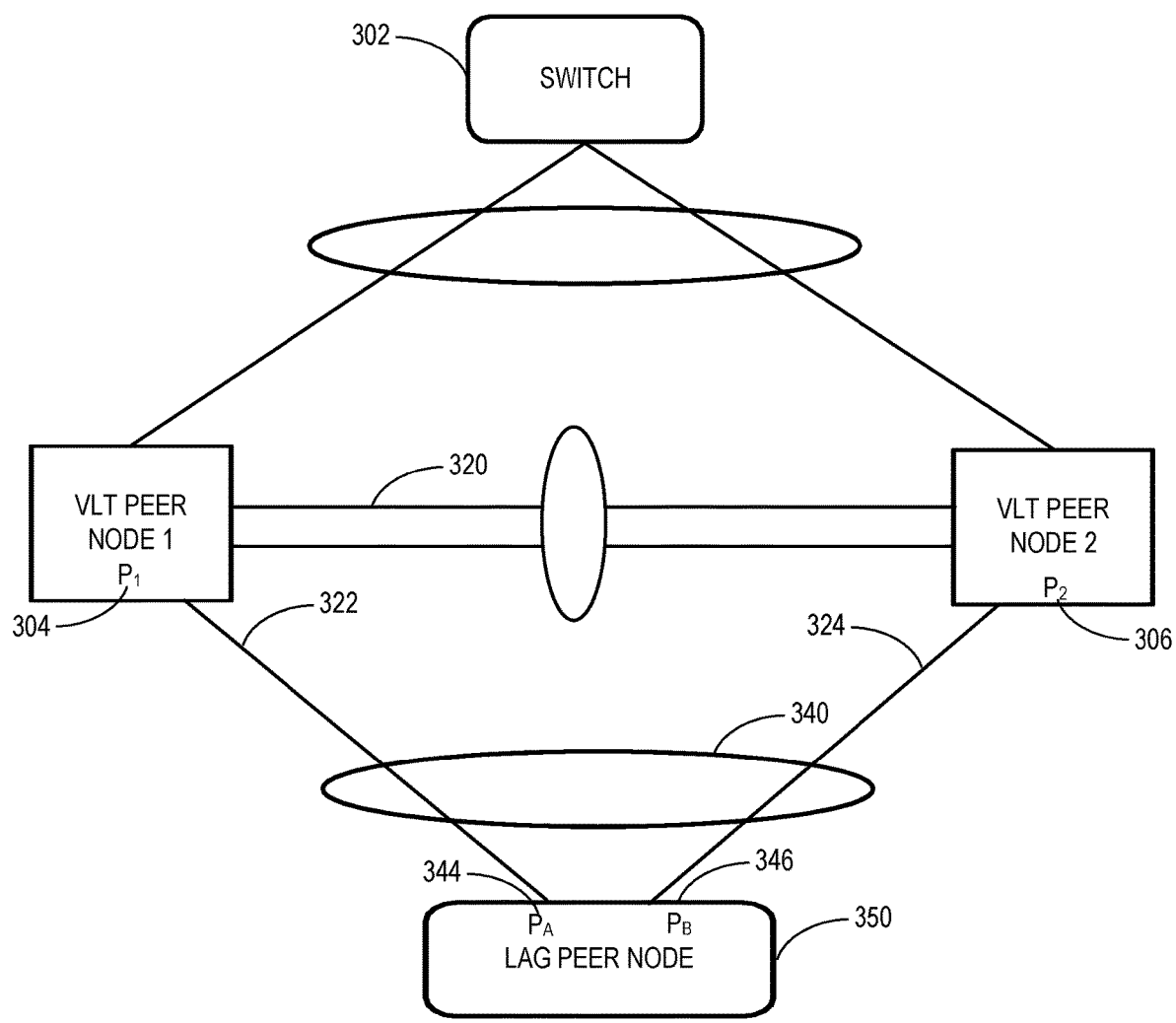
FIG. 3 depicts an illustrative network system that utilizes a LAG and an Inter-Node Links (INL) to reduce traffic loss caused by disruptive port configurations, according to embodiments of the present disclosure.

FIG. 3 depicts an illustrative network system that utilizes a LAG and an INL to reduce traffic loss caused by disruptive port configurations, according to embodiments of the present disclosure. Network system 300 comprises VLT peer node 304 and VLT peer node 306 that may be communicatively coupled via INL 320 and may be implemented as networking switches or routers. Network system 300 further comprises switch 302, LAG 340, and LAG peer node 350. LAG 340, in turn, comprises links 322, 324 that couple respective VLT peer node 304 and VLT peer node 306 with LAG peer node 350. It is understood that although single links are depicted in FIG. 3, any number of links may be employed, for example, to increase bandwidth and/or provide redundancy in network system 300.

As depicted, port $P_1$ in VLT peer node 304 is coupled, via link 322, to port $P_A$ of LAG peer node 350, and port $P_2$ in VLT peer node 306 is coupled, via link 324, to port $P_B$ of LAG peer node 350. It is noted that in forming VLT system 300, peer nodes may be connected via one or more links that may be referred to as INLs, Inter-Chassis Links (ICLs), or Virtual Link Trunk Interconnect (VLTi)—which terms may be used interchangeably herein. These links may be used to connect nodes together to form the VLT system that, in at least some ways, acts with other network devices as a single larger chassis.

In embodiments, when a configuration of port $P_1$ in VLT peer node 304 that requires that port $P_1$ go into a Down state or traffic on port $P_1$ be shut down is initiated, VLT peer node 304 may communicate that information on link 322 with LAG peer node 350 using any message type and/or protocol, and request that LAG peer node 350 not send traffic destined to port $P_1$. VLT peer node 304 may instead request that LAG peer node 350 send traffic destined to port $P_1$ to port $P_2$, here, via port $P_B$. Therefore, despite the configuration update on $P_1$ and resulting Down state of $P_1$, traffic that arrives on port $P_1$ from LAG peer node 350 is not dropped since its redirected to port $P_2$.

In addition, port $P_1$ may be temporarily removed from LAG 340, and egress traffic on port $P_1$ may be redirected away from link 322 and towards port $P_2$, such that the traffic may be routed on VLT peer node 306 via link 324, thereby, preventing that traffic arriving from switch 302 be dropped on port $P_1$. In embodiments, egress traffic on port $P_1$ may be redirected from link 322 to INL 320, since even if INL 320 typically transfers control protocols, e.g., by using a synchronization mechanism that synchronizes VLT peer nodes 304, 306, INL may also be used for data traffic.

It is understood that just as network system 200, network system 300 in FIG. 3 is not limited to the components shown therein or described in the accompanying text. As those skilled in the art will appreciate, a suitable network system may comprise any number of physical and virtual devices in numerous topologies.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

It is understood that just as network system 200, network system 300 in FIG. 3 is not limited to the components shown therein or described in the accompanying text. As those skilled in the art will appreciate, a suitable network system may comprise any number of physical and virtual devices in numerous topologies.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 4:
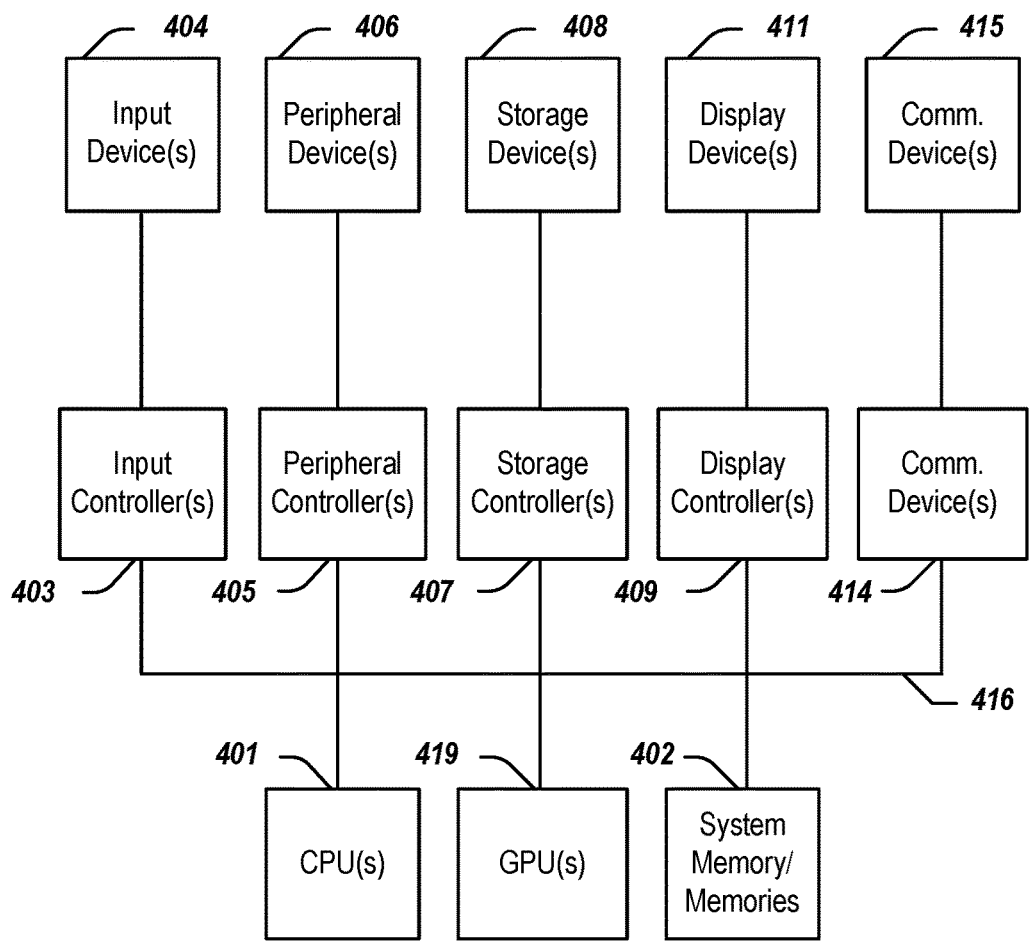
FIG. 4 depicts a simplified block diagram of an information handling system according to embodiments of the present invention.

FIG. 4 depicts a simplified block diagram of an information handling system (or computing system) according to embodiments of the present disclosure. It will be understood that the functionalities shown for system 400 may operate to support various embodiments of a computing system— although it shall be understood that a computing system may be differently configured and include different components, including having fewer or more components as depicted in FIG. 4.

As illustrated in FIG. 4, the computing system 400 includes one or more central processing units (CPU) 401 that provides computing resources and controls the computer. CPU 401 may be implemented with a microprocessor or the like, and may also include one or more graphics processing units (GPU) 419 and/or a floating-point coprocessor for mathematical computations. System 400 may also include a system memory 402, which may be in the form of random-access memory (RAM), read-only memory (ROM), or both.

A number of controllers and peripheral devices may also be provided, as shown in FIG. 4. An input controller 403 represents an interface to various input device(s) 404, such as a keyboard, mouse, touchscreen, and/or stylus. The computing system 400 may also include a storage controller 407 for interfacing with one or more storage devices 408 each of which includes a storage medium such as magnetic tape or disk, or an optical medium that might be used to record programs of instructions for operating systems, utilities, and applications, which may include embodiments of programs that implement various aspects of the present disclosure. Storage device(s) 408 may also be used to store processed data or data to be processed in accordance with the disclosure. The system 400 may also include a display controller 409 for providing an interface to a display device 411, which may be a cathode ray tube (CRT), a thin film transistor (TFT) display, organic light-emitting diode, electroluminescent panel, plasma panel, or other type of display. The computing system 400 may also include one or more peripheral controllers or interfaces 405 for one or more peripherals 406. Examples of peripherals may include one or more printers, scanners, input devices, output devices, sensors, and the like. A communications controller 414 may interface with one or more communication devices 415, which enables the system 400 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 416, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 5:
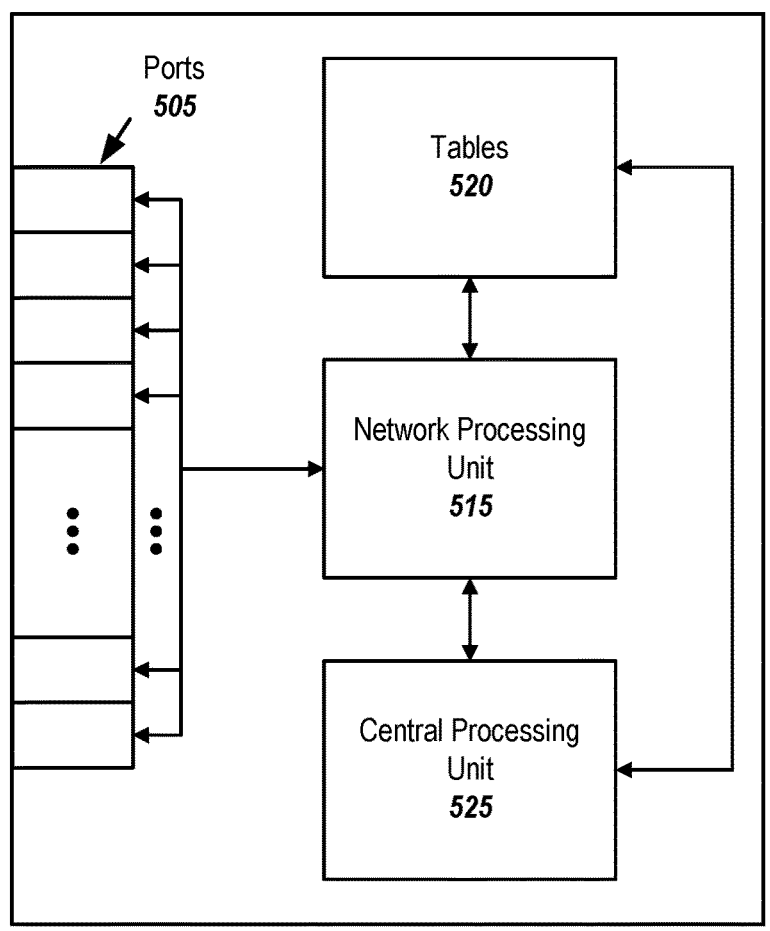
FIG. 5 depicts an alternative block diagram of an information handling system, according to embodiments of the present disclosure.

FIG. 5 depicts an alternative block diagram of an information handling system, according to embodiments of the present disclosure. It will be understood that the functionalities shown for system 500 may operate to support various embodiments of the present disclosure—although it shall be understood that such system may be differently configured and include different components (including fewer or more components).

The information handling system 500 may include a plurality of I/O ports 505, a network processing unit (NPU) 515, one or more tables 520, and a central processing unit (CPU) 525. The system includes a power supply (not shown) and may also include other components, which are not shown for sake of simplicity.

In one or more embodiments, the I/O ports 505 may be connected via one or more cables to one or more other network devices or clients. The network processing unit 515 may use information included in the network data received at the node 500, as well as information stored in the tables 520, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for reducing traffic loss caused by disruptive port configurations, the method comprising:
   receiving a request for a configuration of a port that is associated with a Link Aggregation Group (LAG);
   directing egress traffic from the port to one or more members of the LAG;
   communicating a request to a peer device that is coupled to the port to not forward traffic to the port to prevent that traffic from being dropped on the port;
   in response to determining that traffic on the port has halted, applying the configuration to the port; and
   enabling traffic on the port.

2. The method for reducing traffic loss according to claim 1, wherein the configuration requires at least one of an operational state of the port being disabled for a period of time, or traffic on the port being halted.

3. The method for reducing traffic loss according to claim 2, wherein enabling traffic on the port comprises changing the operational state of the port to allow LAG-hashing on the port.

4. The method for reducing traffic loss according to claim 2, wherein enabling traffic on the port comprises informing peer devices of at least one of the operational state of the port or completion of the configuration.

5. The method for reducing traffic loss according to claim 1, further comprising notifying the peer device that a disruptive configuration may occur on the port.

6. The method for reducing traffic loss according to claim 5, further comprising notifying the peer device that the one or more links associated with the port may be temporarily removed from the LAG.

7. The method for reducing traffic loss according to claim 1, wherein communicating the request to the peer device comprises determining whether Link Aggregation Control Protocol (LACP) is enabled on the LAG.

8. The method for reducing traffic loss according to claim 7, further comprising, in response to determining that LACP is enabled on the LAG, using an LACP message to communicate the request.

9. The method for reducing traffic loss according to claim 7, further comprising, in response to determining that LACP is not enabled on the LAG, using an LLDP message to communicate the request.

10. The method for reducing traffic loss according to claim 9, wherein the LLDP message comprises a vendor-specific Type-Length-Value (TLV) format.

11. The method for reducing traffic loss according to claim 1, wherein directing egress traffic on the port to one or more members of the LAG comprises distributing the traffic according to a ratio of available bandwidths of the one or more members of the LAG.

12. The method for reducing traffic loss according to claim 1, further comprising, in response to determining that traffic on the port has not halted, waiting for a timeout to expire before checking whether the traffic on the port has halted.

13. A communication device that reduces traffic loss caused by disruptive port configurations, the communication device comprising:
   a plurality of ports comprising a first port and a second port that are members of a link aggregation group (LAG) and are configured to communicatively couple to a peer node, the communication device configured to update one or more configurations of the first port by performing steps comprising:
      removing the first port from the LAG;
      directing egress traffic from the first port to the second port to prevent from the egress traffic from being dropped at the first port;
      communicating a request to the peer node to not forward traffic to first port;
      in response to determining that traffic on the first port has halted, applying the one or more configurations to the first port; and
      enabling traffic on the first port.

14. The communication device according to claim 13, wherein the one or more configurations require at least one of an operational state of the first port being disabled for a period of time, or traffic on the first port being halted.

15. The communication device according to claim 13, wherein communicating the request to the peer node comprises determining whether Link Aggregation Control Protocol (LACP) is enabled on the LAG.

16. The communication device according to claim 13, further comprising, in response to determining that LACP is enabled on the LAG, using an LACP message to communicate the request.

17. A non-transitory computer-readable medium or media comprising one or more sequences of instructions which, when executed by at least one processor, causes steps to be performed comprising:
   receiving a request for a configuration of a port that is associated with a Link Aggregation Group (LAG);

directing egress traffic from the port to one or more members of the LAG;

communicating a request to a peer device that is coupled to the port to not forward traffic to the port to prevent that traffic from being dropped on the port;

in response to determining that traffic on the port has halted, applying the configuration to the port; and enabling traffic on the port.

18. The non-transitory computer-readable medium or media according to claim 17, wherein the configuration requires at least one of an operational state of the port being disabled for a period of time, or traffic on the port being halted.

19. The non-transitory computer-readable medium or media according to claim 17, wherein communicating the request to the peer device comprises determining whether Link Aggregation Control Protocol (LACP) is enabled on the LAG.

20. The non-transitory computer-readable medium or media according to claim 19, further comprising, in response to determining that LACP is not enabled on the LAG, using an LLDP message to communicate the request.

* * * * *